United States Patent
Leung et al.

(10) Patent No.: US 8,027,383 B2
(45) Date of Patent: Sep. 27, 2011

(54) MOSQUITO NOISE REDUCTION FILTER IN DIGITAL DECODERS

(75) Inventors: Ho-Ming Leung, Cupertino, CA (US); Suryanaryana M. Potharaju, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 1506 days.

(21) Appl. No.: 11/452,030

(22) Filed: Jun. 13, 2006

(65) Prior Publication Data
US 2007/0286290 A1  Dec. 13, 2007

(51) Int. Cl.
*H04N 7/12* (2006.01)
*H04N 11/02* (2006.01)

(52) U.S. Cl. .............. 375/240.03; 375/240.26

(58) Field of Classification Search . 375/240.01–240.29
See application file for complete search history.

(56) References Cited

U.S. PATENT DOCUMENTS

| | | | | |
|---|---|---|---|---|
| 6,064,776 | A | * | 5/2000 | Kikuchi et al. ............... 382/260 |
| 6,285,717 | B1 | * | 9/2001 | Bahng et al. ............. 375/240.29 |
| 6,937,662 | B2 | * | 8/2005 | Del Corso ................ 375/240.27 |
| 7,012,960 | B2 | * | 3/2006 | Bourge et al. ............ 375/240.12 |
| 2004/0036807 | A1 | * | 2/2004 | Takahashi et al. ............ 348/700 |
| 2006/0117371 | A1 | * | 6/2006 | Margulis ....................... 725/131 |

* cited by examiner

*Primary Examiner* — David Czekaj
(74) *Attorney, Agent, or Firm* — Christopher P. Maiorana, PC

(57) ABSTRACT

A method for processing a compressed signal of digital video is disclosed. The method generally includes the steps of (A) generating a decompressed signal by decompressing the compressed signal of digital video, (B) generating a filtered signal by spatial filtering the decompressed signal, wherein the spatial filtering is arranged to reduce mosquito noise within the decompressed signal and (C) generating a video signal by adding synchronization information to the filtered signal, the synchronization information being suitable for synchronizing a video display to the filtered signal.

18 Claims, 5 Drawing Sheets

MOSQUITO NOISE REDUCTION FILTER IN DIGITAL DECODERS

FIELD OF THE INVENTION

The present invention relates to digital video decompression generally and, more particularly, to a mosquito reduction filter in standard definition and high definition digital decoders.

BACKGROUND OF THE INVENTION

Mosquito noise refers to distortion of images around sharp edges in digital video pictures. The sharp edges exist in movie titles, types of bikes/cars in racing video and around similar high-contrast edges. The mosquito noise appears as artifacts such as haziness or shimmering around edges. The artifacts are created when the images undergo discrete cosine transforms during compression. The artifacts become more visible in high frequency content with sharp transitions between foreground entities and a background.

Conventional mosquito noise reduction solutions involve special techniques during encoding to reduce the artifacts. A common approach has been to soften the sharp edges to prevent the mosquito noise from being created. However, the special techniques to not afford a solution to deal with the mosquito noise at the decoding/display end.

SUMMARY OF THE INVENTION

The present invention concerns a method for processing a compressed signal of digital video. The method generally comprises the steps of (A) generating a decompressed signal by decompressing the compressed signal of digital video, (B) generating a filtered signal by spatial filtering the decompressed signal, wherein the spatial filtering is arranged to reduce mosquito noise within the decompressed signal and (C) generating a video signal by adding synchronization information to the filtered signal, the synchronization information being suitable for synchronizing a video display to the filtered signal.

The objects, features and advantages of the present invention include providing a mosquito reduction filter in standard definition and high definition digital decoders that may (i) reduce mosquito noise, (ii) permit adaptive tuning of the filter parameters in real time, (iii) reduce filtering where no mosquito noise is anticipated, (iv) permit adaptive tuning of the filter parameters based on decoding information extracted from a bitstream, (v) reduce work in a video processing stage and/or (vi) provide a simple and effective manner for implementation.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
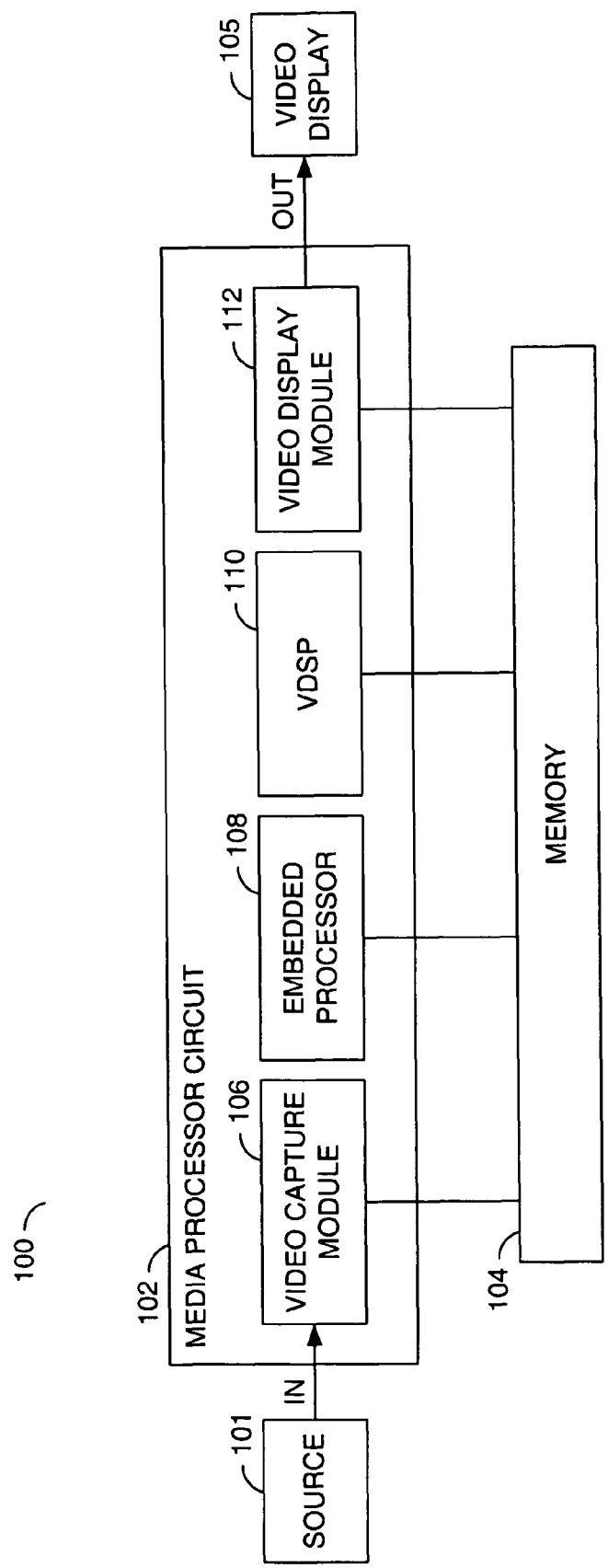
FIG. 1 is a block diagram of an example implementation of a system in accordance with a preferred embodiment of the present invention.

Referring to FIG. 1, a block diagram of an example implementation of a system 100 is shown in accordance with a preferred embodiment of the present invention. The system (or circuit) 100 may be referred to as a decoder system. The decoder system 100 generally comprises a source 101, a circuit (or module) 102, a circuit (or module) 104 and a display 105. An input signal (e.g., IN) may be received by the circuit 102 from the source 101. The circuit 102 may generate an output signal (e.g., OUT) to the display 105. The circuit 102 may be in communication with the circuit 104 to move video data and video-related information back and forth.

The signal IN may be a compressed video signal, generally referred to as a bitstream. The signal IN may comprises a sequence of progressive-format frames and/or interlace-format fields. The signal IN may be compliant with a VC-1, MPEG and/or H.26x standard. The MPEG/H.26x standards generally include H.261, H.264, H.263, MPEG-1, MPEG-2, MPEG-4 and H.264/AVC. The MPEG standards may be defined by the Moving Pictures Expert Group, International Organization for Standards, Geneva, Switzerland. The H.26x standards may be defined by the International Telecommunication Union-Telecommunication Standardization Sector, Geneva, Switzerland. The VC-1 standard may be defined by the document Society of Motion Picture and Television Engineer (SMPTE) 421M-2006, by the SMPTE, White Plains, N.Y.

The signal OUT may be one or more analog video signals and/or one or more digital video signals. The signal OUT generally comprises a sequence of progressive-format frames and/or interlace-format fields. The signal OUT may include synchronization signals suitable for synchronizing the display 105 with the video information. The signal OUT may be generated in analog form as, but is not limited to, an RGB (Red, Green, Blue) signal, an EIA-770 (e.g., YCrCb) signal, an S-video signal and/or a Composite Video Baseband Signal (CVBS). In digital form, the signal OUT may be generated as, but is not limited to, a High Definition Multimedia Interface (HDMI) signal, a Digital Video Interface (DVI) signal and/or a BT.656 signal. The signal OUT may be formatted as a standard definition signal or a high definition signal.

The source 101 may be operational to generate the signal IN. The source may include, but is not limited to, a DVD drive, a hard drive, a digital set-top-box and/or a satellite receiver. The source 101 may present the signal IN as a compressed digital video bitstream.

The circuit 102 may be referred to as a media processor circuit. The media processor circuit 102 may be operational to decode and format the video information received in the signal IN to generate the signal OUT. Decoding may be compatible with the VC-1, MPEG and/or H.26x standards.

The circuit 104 may be referred to as a memory circuit. The memory circuit 104 may be operational to temporarily buffer frames/fields (pictures) and other information used in decoding and formatting the digital video and audio data. The memory circuit 104 may be implemented as a single data rate (SDR) dynamic random access memory (DRAM) or a double data rate (DDR) DRAM. Other memory technologies may be implemented to meet the criteria of a particular application.

The video display 105 may be operational to convert the video information received in the signal OUT into a sequence of viewable images. The images may comprise standard definition images and/or high definition images. Other image sizes may be implemented to meet the criteria of a particular application.

The media processor circuit 102 generally comprises a circuit (or module) 106, a circuit (or module) 108, a circuit (or module) 110 and a circuit (or module) 112. The circuit 106 may receive the signal IN. The signal OUT may be generated and presented by the circuit 112. All of the circuits 106, 108, 110 and 112 may be in communication with the memory circuit 104 to read and write video data, video-related information and other data.

The circuit 102 may be referred to as a video capture circuit. The video capture circuit 102 may be operational to capture data from the signal IN. In some embodiments, the video capture circuit 102 may also be operational to gather decompression information from the pictures within the signal IN.

The circuit 108 may be referred to as an embedded processor circuit. The embedded processor circuit 108 may be operational control the overall operations of the decoder system 100. The embedded processor circuit 108 may be implemented as a SPARC processor. Other processor technologies may be implemented to meet the criteria of a particular application.

The circuit 110 may be referred to as a video digital signal processor (VDSP) circuit. The VDSP circuit 110 may be operational to perform high speed processing on the video data. In some embodiments, the VDSP circuit 110 may be operational to gather additional decompression information from the pictures in the signal IN.

The circuit 112 may be referred to as a video display circuit. The video display circuit 112 is generally operational to generate the signal OUT. The video display circuit 112 may include a filtering capability (or block) for performing mosquito noise filtering. The circuit 112 may also be operational to synchronize the signal OUT and the video display 105.

Figure 2:
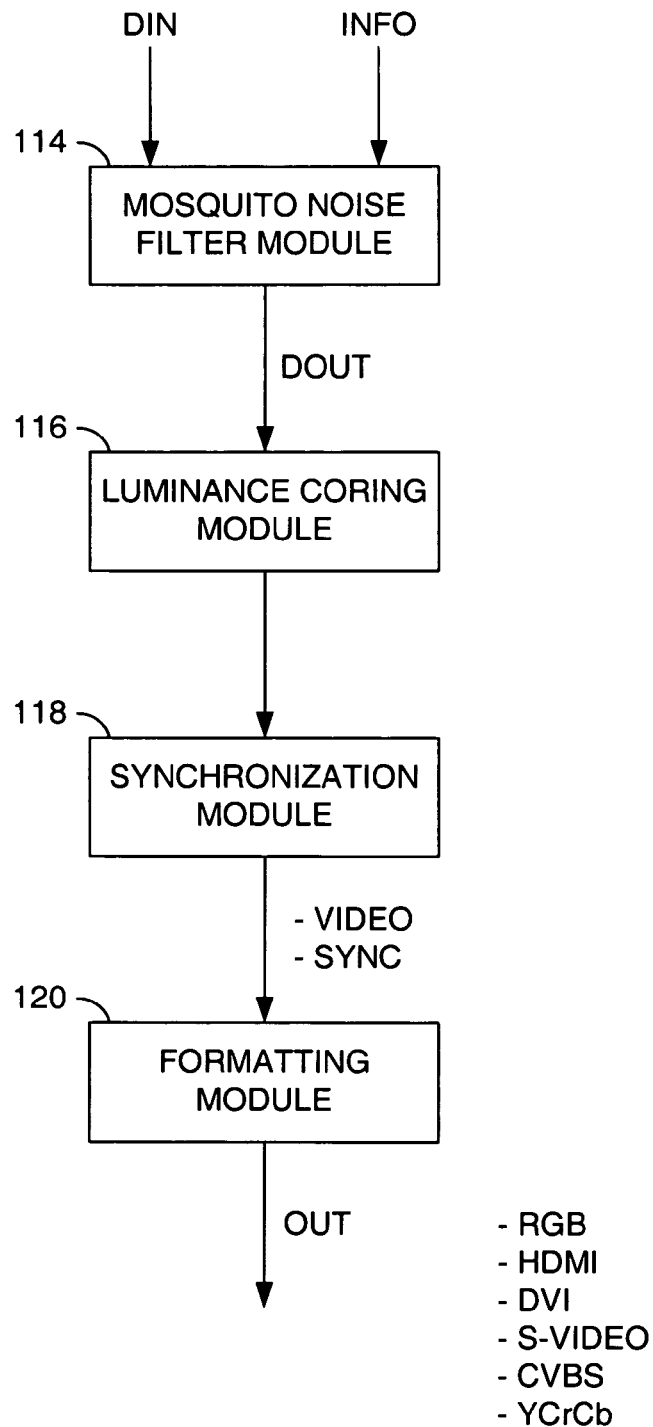
FIG. 2 is a functional block diagram of a video display module within the system.

Referring to FIG. 2, a functional block diagram of the video display module 112 is shown. The video display module 112 generally comprises a module (or block) 114, a module (or block) 116, a module (or block) 118 and a module (or block) 120. A signal (e.g., DIN) may be received by the module 114. A signal (e.g., INFO) may also be received by the module 114. The module 114 may generate and present a signal (e.g., DOUT) to the module 116. The module 120 may generate the signal OUT.

The signal DIN may be an intermediate signal generated by the VDSP circuit 110. The signal DIN generally comprises the decompressed video pictures (e.g., fields and/or frames) in digital form. Some of the video pictures may contain mosquito noise.

The signal INFO may be an information signal generated by the video capture circuit 106 and/or the VDSP circuit 110. Data within the signal INFO may be derived from a decoding operation of the media processor circuit 102 operating on the compressed signal IN. The data in the signal INFO may be used by the circuit 114 to dynamically adjust a mosquito noise filtering operation on-the-fly (e.g., up to one or more adjustments per decoded picture).

The module 114 may be referred to as a mosquito noise filter module. The mosquito noise filter module 114 may be operational to perform a spatial mosquito noise filtering of the video pictures received in the signal DIN. The mosquito noise filter module 114 may be implemented as a programmable bandpass Finite Impulse Response (FIR) filter or an Infinite Impulse Response (IIR) filter. The bandpass may have a pass frequency range of approximately 3 megahertz (MHz) to approximately 7 MHz. Mosquito noise filtering may be performed on the luminance (luma) component of the video pictures. The mosquito noise filtering is generally not performed on the chrominance (chroma) components of the video pictures.

The module 116 may be referred to as a luma coring module. The luma coring module 116 may be operational to perform additional filtering on the video pictures. The luma coring is generally performed to increase a sharpness of the video pictures.

The module 118 may be referred to as a synchronization module. The synchronization module 118 may be operational to generate synchronization information useful for synchronizing the display 105 with the pictures in the signal OUT. The synchronization information generally includes line synchronization data and frame/field synchronization data.

The module 120 may be referred to as a formatting module. The formatting module 120 may be operational to arrange the video picture information and the synchronization information in compliance with one or more video transfer standards (e.g., RGB, CVBS, DVI, HDMI, etc.). The formatting module 120 may include a digital-to-analog conversion capability for generating analog type output signals.

An advantage offered by reducing the mosquito noise in the video display circuit 112, instead of either (i) the VDSP circuit 102 and/or (ii) between the media processor circuit 102 and the display 105, may be to reduce processing at the other location that may consume a large number of computational steps. Furthermore, by performing the mosquito noise reduction inside the media processor circuit 102, instead of between the media processor circuit 102 and the display 105, decompression parameters gathered during the decompression of the signal IN may be used in altering the mosquito noise filtering characteristics. By adding the mosquito noise filter in the display stage (e.g., video display circuit 112) the reduction of the mosquito noise is generally handled in a much simpler, yet an effective manner compared with conventional techniques.

Figure 3:
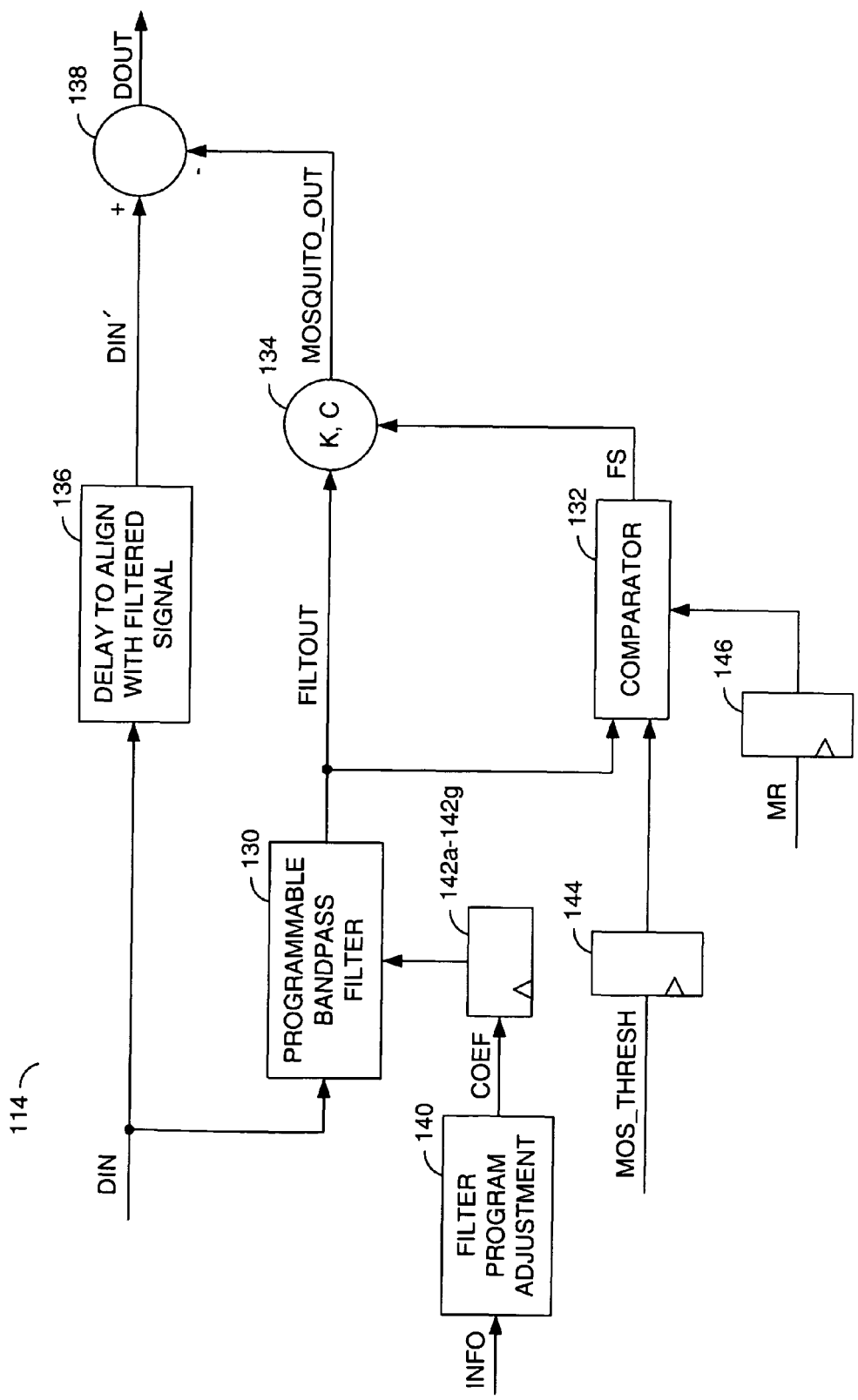
FIG. 3 is a functional diagram of an example implementation of a mosquito noise filter within the video display module.

Referring to FIG. 3, a functional diagram of an example implementation of the mosquito noise filter 114 is shown. The mosquito noise filter 114 generally comprises a module (or block) 130, a module (or block) 132, a module (or block) 134, a module (or block) 136, a module (or block) 138, a module (or block) 140, multiple registers 142a-142g, a register 144 and a register 146.

The signal DIN may be received by the module 130 and the module 136. The signal INFO may be received by the module 140. The signal DOUT may be generated and presented by the module 138. A threshold signal (e.g., MOS_THRESH) may be buffered by the register 144 and received by the module 132. A rate signal (e.g., MR) may be buffered by the register 146 and received by the module 132. A filtered signal (e.g., FILTOUT) may be generated by the module 130 and presented to both the module 132 and the module 134. The module 132 may generate a filter select signal (e.g., FS) presented to the module 134. The module 134 may generate a removal signal (e.g., MOSQUITO_OUT) presented to the module 138. A coefficient signal (e.g., COEF) may be generated by the module 140, buffered by the registers 142a-142g and presented to the module 130. The module 136 may present a delayed signal (e.g., DIN') to the module 138.

The module 130 may be referred to as a bandpass filter module. The bandpass filter module 130 may be operational to filter the luminance video data received in the signal DIN based on the coefficient values stored in the programmable registers 142a-142g. The filtered video data may be presented from the bandpass filter module 130 in the signal FILTOUT.

The module 132 may be referred to as a comparator module. The comparator module 132 may be operational to compare the filtered video data in the signal FILTOUT to a programmable mosquito threshold value conveyed in the signal MOS_THRESH. The comparison may also be based on a mosquito rate value from the signal MR. The comparator module 132 may generate the filter select signal FS based on the signals FILTOUT, MOS_THRESH and MR. The filter select signal FS may carry multiple values (e.g., K and C) for each line of video data being filtered.

The module 134 may be referred to as a select module. The select module 134 may be operational to alter the filtered video data in the signal FILTOUT per the information received in the signal FS. The altered filtered video data may be presented from the select module 134 in the removal signal MOSQUITO_OUT.

The module 136 may be referred to as a delay module. The delay module 136 may be operational to delay the unfiltered video data received in the video signal DIN. A length of the delay through the delay module 136 may be set to match a delay through the bandpass filter module 130, the comparator module 132 and the select module 134. The delayed unfiltered video data may be presented in the signal DIN'.

The module 138 may be referred to as a substracter module. The substracter circuit 138 may be operational to subtract the values in the removal signal MOSQUITO_OUT from the values in the delayed signal DIN'. The resulting values generally represent the filtered video data and may be presented in the signal DOUT.

The module 140 may be referred to as an adjustment module. The adjustment module 140 may be operational to generate programmable coefficient values in the signal COEF based on the decoding information received in the signal STAT. The coefficient values may be determined imperically by filtering different test streams with different parameter sets to determine the best visual results. Several sets of filter coefficients may be stored in a lookup table in the adjustment module 140. During operation, the adjustment module 140 may present one set of filter coefficients at a time from the lookup table based on the quantization parameter values and/or bitrates received in the signals.

The bandpass filter module 130 may be constructed as a multiple (e.g., 13) tap programmable FIR filter per equation 1 as follows:

$$FILTOUT[N] = coef6 \times DIN[N+6] + coef5 \times DIN[N+5] + \\ coef4 \times DIN[N+4] + coef3 \times DIN[N+3] + \\ coef2 \times DIN[N+2] + coef1 \times DIN[N+1] + \\ coef0 \times DIN[N] + coef1 \times DIN[N-1] + coef2 \times DIN[N-2] + \\ coef3 \times DIN[N-3] + coef4 \times DIN[N-4] + \\ coef5 \times DIN[N-5] + coef6 \times DIN[N-6]$$ Eq. (1)

where coef6, coef5, coef4, coef3, coef2, coef1 and coef0 may be the programmable coefficients stored in the registers 142a-142g and N may be an index value of a current position along a horizontal line of video data in an input signal (e.g., DIN). Since the programmable coefficients are generally symmetrical about the index value N, the bandpass filter module 130 may be implemented with a reduced number of multipliers. The coefficients coef0 to coef6 may be stored as multi-bit (e.g., 12-bit 2's complement) numbers, each having a sign bit and a several-bit (e.g., 11-bit) fraction. The coefficient values may be stored in dedicated registers 142a-142g.

Figure 4:
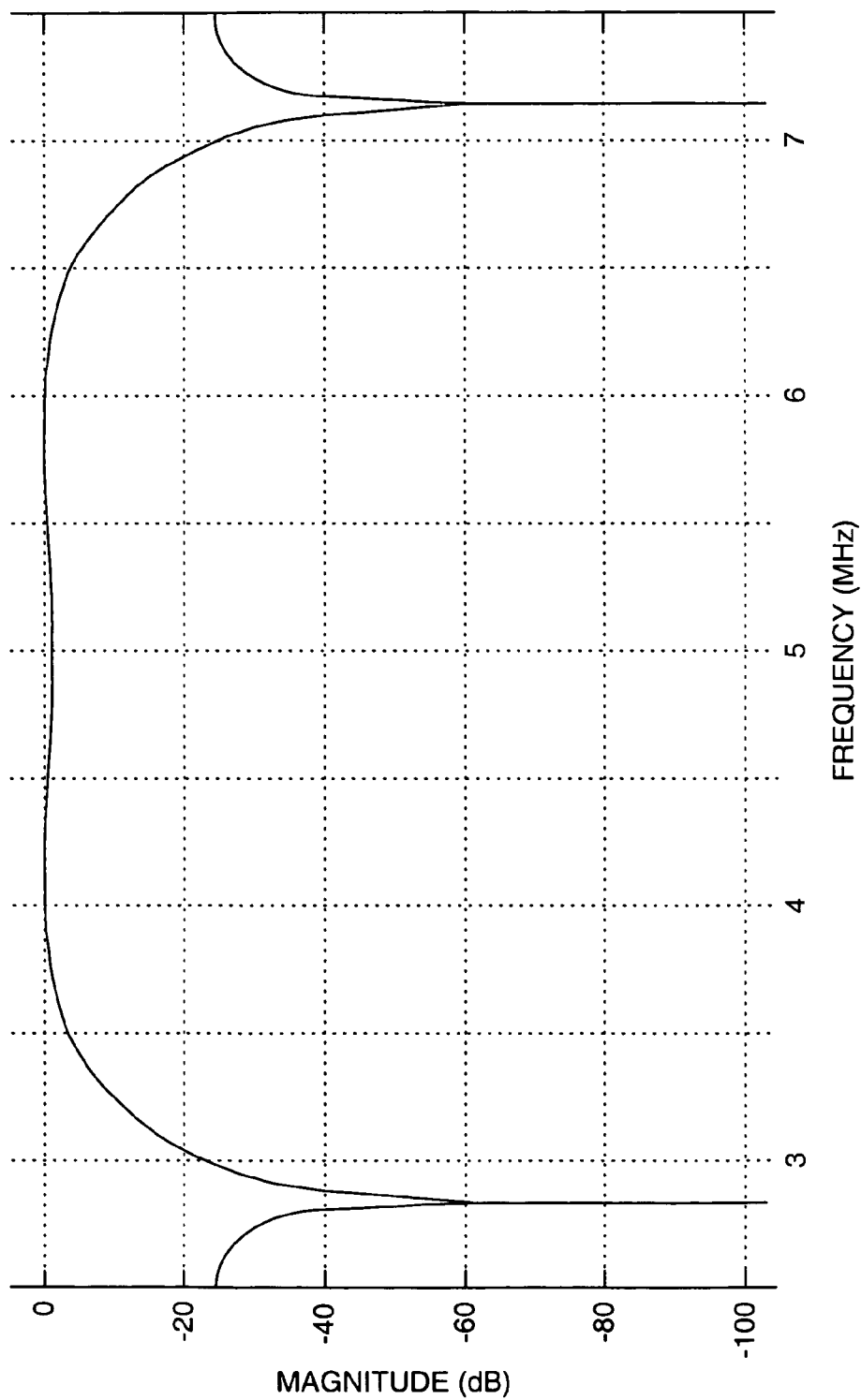
FIG. 4 is a diagram of an example frequence response of a bandpass filter module.

Referring to FIG. 4, a diagram of an example frequence response of the bandpass filter module 130 is shown. A center frequency of the bandpass filter module 130 may be adjusted by programming appropriate values for the different coefficients. A typical filter may use the following coefficients:
coef0=+1207/2048
coef1=0/2048
coef2=−592/2048
coef3=0/2048
coef4=−146/2048
coef5=0/2048
coef6=+80/2048

The adjustment module 140 may be operational to anticipate if mosquito noise is or is not present in the video pictures in the signal INFO. Mosquito noise generally exists at low bit rates (e.g., <1 megabits/second) but not at high bit rates (e.g., >30 megabits/seconds). Furthermore, the quantization parameter may be a good indication of the presence/absence of the mosquito noise. Therefore, the adjustment module 140 may present filter parameters to actively filter the video when one or both of the bit rate value and quantization parameter value anticipate mosquito noise. Likewise, the filter parameters may be selected from the lookup table to pass the images unfiltered through the programmable bandpass filter 130 when the bit rate values and/or quantization parameter values anticipate insignificant or no mosquito noise.

Referring again to FIG. 3, an output of the mosquito filter module 114 may be defined by equation 2 as follows:

DOUT=DIN−MOSQUITO_OUT    Eq. (2)

The value in the signal MOSQUITO_OUT may be defined by equation 3 as follows:

MOSQUITO_OUT=K×FILTOUT+C    Eq. (3)

where K and C are generally determined from the following conditions:
1. K=1, C=0 when (|FILTOUT|<MOS_THRESH)
2. K=−1, C=sign(FILTOUT)×2×MOS_THRESH when (|FILTOUT|>MOS_THRESH, MR=0)
3. K=−2, C=sign(FILTOUT)×3×MOS_THRESH when (|FILTOUT|>MOS_THRESH, MR=1)
4. K=0, C=0 when (|FILTOUT|>MOS_THRESH×2, MR=0)
5. K=0, C=0 when (|FILTOUT|>MOS_THRESH×1.5, MR=1)

where sign(X)=1 when X>=0; sign(X)=−1 when X<0.

Figure 5:
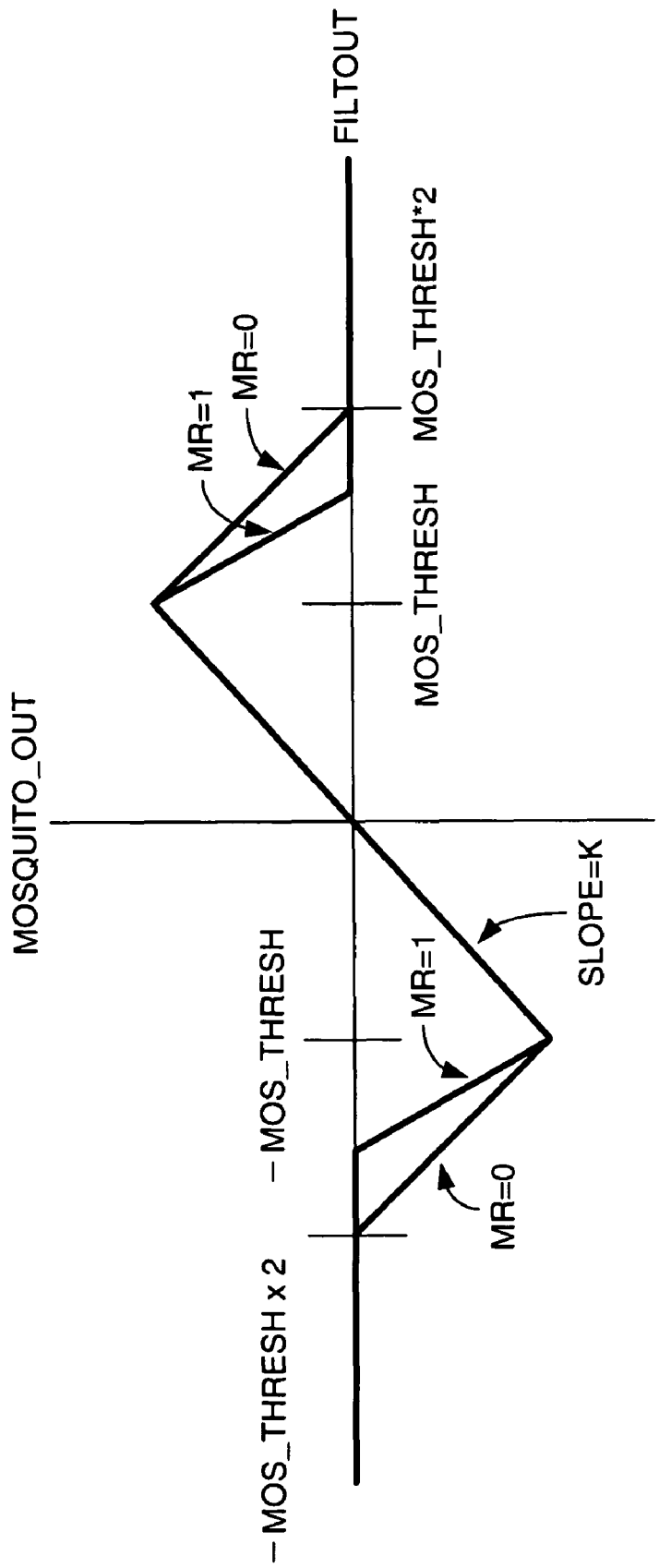
FIG. 5 is a diagram of an example transfer curve for a removal signal as a function of a rate signal.

Referring to FIG. 5, a diagram of an example transfer curve for the signal MOSQUITO_OUT as a function of the signal MR is shown. The select module 134 generally transfers the values in the signal FILTOUT to the signal MOSQUITO_OUT with a gain of K where the values are between a positive MOS_THRESH value and a negative MOS_THRESH value. Above the positive MOS_THRESH value and below the negative MOS_THRESH value, the select module 134 gradually attenuates the signal MOSQUITO_OUT at a rate based on the value of the signal MR. Above/below second thresholds (determined by the value in the signal MR), the removal signal MOSQUITO_OUT may be held at a zero value (e.g., no mosquito noise removal).

In implementations where the coefficients are 2's complement 12-bit numbers with 11 bit fractions, the hardware generally carries all of the bits until a last accumulation. At the last accumulation, a constant value of +0.5 may be added (e.g., added with binary 10000000000) to the accumulated value. The accumulated value may then be right shifted by 11 bits. The resulting output value may be clamped back to 8 bits. For the first and last few pixels of a row that index nonexisting out-of-row input pixels, filtering may be performed with (i) a first pixel replacing all of the left side nonexisting pixels and (ii) a last pixel replacing all of the right side nonexisting pixels. For a typical application, the value of MR may be set to zero and the value of MOS_THRESH may be set to 16 or 20. Other values of MR and MOS_THRESH may be implemented to meet the criteria of a particular application.

The function performed by the functional block diagrams of FIGS. 2 and 3 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMS, RAMs, EPROMS, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method for processing a compressed signal of digital video, comprising the steps of:
    (A) generating a decompressed signal by decompressing said compressed signal of digital video;
    (B) generating a first signal by spatial filtering said decompressed signal;
    (C) generating a second signal by comparing an amplitude of said first signal with a first threshold;
    (D) generating a third signal by modifying said first signal in response to said second signal; and
    (E) generating a video signal by subtracting said third signal from said decompressed signal to reduce mosquito noise, wherein (i) said third signal is attenuated in response to a programmable constant where said amplitude of said first signal is between said first threshold and a second threshold and (ii) said programmable constant has at most a unity value.

2. The method according to claim 1, wherein said spatial filtering operates on a luminance component of said decompressed signal.

3. The method according to claim 1, further comprising the step of:
    generating an output signal by a digital-to-analog conversion of said video signal.

4. The method according to claim 1, further comprising the step of:
    generating an output signal by formatting said video signal per a High Definition Multimedia Interface standard.

5. The method according to claim 1, further comprises the step of:
    delaying said decompressed signal before subtracting said third signal.

6. The method according to claim 1, wherein step (D) comprises the sub-step of:
    generating said third signal by scaling said first signal where said amplitude of said first signal is smaller than said first threshold.

7. The method according to claim 1, further comprising the step of:
    generating a fourth signal carrying a plurality of filter parameters based on a plurality of compression parameters determined from said compressed signal, wherein said filter parameters predict which of a plurality of pictures within said compressed signal contain said mosquito noise and which of said pictures do not contain said mosquito noise.

8. The method according to claim 7, further comprising the step of:
    modifying said spatial filtering based on said filter parameters such that said pictures predicted to have said mosquito noise are filtered greater than said pictures not predicted to have said mosquito noise.

9. The method according to claim 7, wherein said compression parameters comprises a plurality of bitrates.

10. The method according to claim 7, wherein said compression parameters comprises a plurality of quantization levels.

11. The method according to claim 1, wherein step (D) further comprises the sub-step of:
    generating said third signal as a constant value where said amplitude of said first signal is greater than said second threshold.

12. A system comprising:
    a memory circuit configured to buffer a compressed signal of digital video; and
    a processor circuit configured to (i) generate a decompressed signal by decompressing said compressed signal of digital video, (ii) generate a first signal by spatial filtering said decompressed signal, and (iii) generate a second signal by comparing an amplitude of said first signal with a first threshold, (iv) generate a third signal by modifying said first signal in response to said second signal and (v) generate a video signal by subtracting said third signal from said decompressed signal to reduce mosquito noise, wherein (a) said third signal is attenuated in response to a programmable constant where said amplitude of said first signal is between said first threshold and a second threshold and (b) said programmable constant has at most a unity value.

13. The system according to claim 12, wherein said processor circuit is further configured to generate said third signal by scaling said first signal where said amplitude of said first signal is smaller than said first threshold.

14. The system according to claim 12, wherein said processor circuit is further configured to generate a fourth signal carrying a plurality of filter parameters based on a plurality of compression parameters determined from said compressed signal, said filter parameters predicting which of a plurality of pictures within said compressed signal contain said mosquito noise and which of said pictures do not contain said mosquito noise.

15. The system according to claim 14, wherein said processor circuit is further configured to modify said spatial filtering based on said filter parameters such that said pictures predicted to have said mosquito noise are filtered greater than said pictures not predicted to have said mosquito noise.

16. The system according to claim 12, wherein said processor circuit is further configured to generate said third signal as a constant value where said amplitude of said first signal is greater than said second threshold.

17. The system according to claim 12, wherein said second threshold is (i) twice said first threshold where said programmable constant has a first value and (ii) less than twice said first threshold where said programmable constant has said unity value.

18. A system comprising:
means for buffering a compressed signal of digital video; and
means for (i) generating a decompressed signal by decompressing said compressed signal of digital video, (ii) generating a first signal by spatial filtering said decompressed signal, (iii) generating a second signal by comparing an amplitude of said first signal with a first threshold, (iv) generating a third signal by modifying said first signal in response to said second signal and (v) generating a video signal by subtracting said third signal from said decompressed signal to reduce mosquito noise, wherein (a) said third signal is attenuated in response to a programmable constant where said amplitude of said first signal is between said first threshold and a second threshold and (b) said programmable constant has at most a unity value.

* * * * *